US009027620B2

(12) United States Patent
Cinget et al.

(10) Patent No.: US 9,027,620 B2
(45) Date of Patent: May 12, 2015

(54) TIRE HAVING A DOUBLE CORD STITCH KNIT FABRIC IN SIDEWALL AREA

(75) Inventors: Dominique Cinget, Combles (FR);
Purushothama Kini Ullal, Singapore (SG); Johann Peschek, Ghent (BE);
Franck Catteau, Marquette lez Lille (FR)

(73) Assignee: Milliken & Company, Spartanburg, SC (US)

( * ) Notice: Subject to any disclaimer, the term of this patent is extended or adjusted under 35 U.S.C. 154(b) by 507 days.

(21) Appl. No.: 13/231,541

(22) Filed: Sep. 13, 2011

(65) Prior Publication Data

US 2013/0061997 A1    Mar. 14, 2013

(51) Int. Cl.
| B60C 15/06 | (2006.01) |
| B60C 9/00 | (2006.01) |
| B29D 30/38 | (2006.01) |
| B29D 30/72 | (2006.01) |
| B60C 9/11 | (2006.01) |
| B60C 9/12 | (2006.01) |
| B32B 5/02 | (2006.01) |

(52) U.S. Cl.
CPC ......... *B29D 30/38* (2013.01); *Y10T 152/10855* (2015.01); *Y10T 152/10828* (2015.01); *B29D 30/72* (2013.01); *B29D 2030/383* (2013.01); *B29D 2030/386* (2013.01); *B29D 2030/722* (2013.01); *B60C 9/11* (2013.01); *B60C 9/12* (2013.01); *B32B 5/026* (2013.01)

(58) Field of Classification Search
None
See application file for complete search history.

(56) References Cited

U.S. PATENT DOCUMENTS

| 4,067,210 | A | * | 1/1978 | Arons et al. ..................... 66/202 |
| 4,739,814 | A | | 4/1988 | Berczi et al. ................... 152/527 |
| 4,828,909 | A | * | 5/1989 | Davis et al. .................... 442/105 |
| 5,029,457 | A | * | 7/1991 | Gajjar .............................. 66/195 |
| 5,309,971 | A | | 5/1994 | Baker et al. .................... 152/541 |
| 5,365,988 | A | | 11/1994 | Soderberg et al. ............. 152/527 |
| 5,691,030 | A | | 11/1997 | De Meyer ...................... 428/107 |
| 6,046,262 | A | | 4/2000 | Li et al. .......................... 524/261 |
| 6,282,926 | B1 | | 9/2001 | Matsuda et al. ................ 66/192 |
| 6,333,281 | B1 | | 12/2001 | Li et al. .......................... 442/157 |
| 6,346,563 | B1 | | 2/2002 | Li et al. .......................... 524/261 |
| 6,389,851 | B1 | | 5/2002 | Groshens ........................ 66/192 |
| 6,444,322 | B1 | | 9/2002 | Li et al. .......................... 428/447 |
| 6,595,257 | B2 | | 7/2003 | Roget et al. .................... 152/550 |
| 6,602,379 | B2 | | 8/2003 | Li et al. .......................... 156/335 |
| 6,659,148 | B1 | | 12/2003 | Alie et al. ....................... 152/539 |
| 6,686,301 | B2 | | 2/2004 | Li et al. .......................... 524/261 |
| 7,252,129 | B2 | | 8/2007 | Michiels et al. ............... 152/531 |
| 7,413,779 | B2 | * | 8/2008 | Gorman et al. ............. 427/389.9 |

(Continued)

FOREIGN PATENT DOCUMENTS

| DE | 102008045116 | * | 3/2010 |
| JP | 6-199114 | * | 7/1994 |

(Continued)

OTHER PUBLICATIONS

Machine tranlsation of JP 2005-281932, 2005.*

*Primary Examiner* — Justin Fischer
(74) *Attorney, Agent, or Firm* — Cheryl J. Brickey

(57) ABSTRACT

A tire containing a pair of beads, at least one carcass ply extending from one bead to the other bead forming a pair of sidewall areas of the tire and a tread area of the tire, and at least one layer of a knit fabric in the sidewall area of the tire, where the knit fabric has a warp and weft direction and is a double cord stitch knit fabric. A method of making the fabric and tire are also disclosed.

8 Claims, 9 Drawing Sheets

(56) References Cited

U.S. PATENT DOCUMENTS

| | | |
|---|---|---|
| 7,614,436 B2 | 11/2009 | Ternon et al. .................. 152/526 |
| 2006/0185778 A1* | 8/2006 | Michiels et al. .............. 152/533 |
| 2009/0294008 A1 | 12/2009 | Michiels et al. .............. 152/527 |
| 2009/0294010 A1 | 12/2009 | Michiels et al. .............. 152/527 |
| 2009/0294025 A1 | 12/2009 | Michiels et al. .............. 156/117 |
| 2010/0018626 A1 | 1/2010 | Imhoff et al. .................. 152/556 |
| 2010/0255744 A1* | 10/2010 | Callaway et al. ............. 442/313 |

FOREIGN PATENT DOCUMENTS

| | | | |
|---|---|---|---|
| JP | 2005-281932 | * | 10/2005 |
| KR | 2001002256 | * | 1/2001 |

* cited by examiner

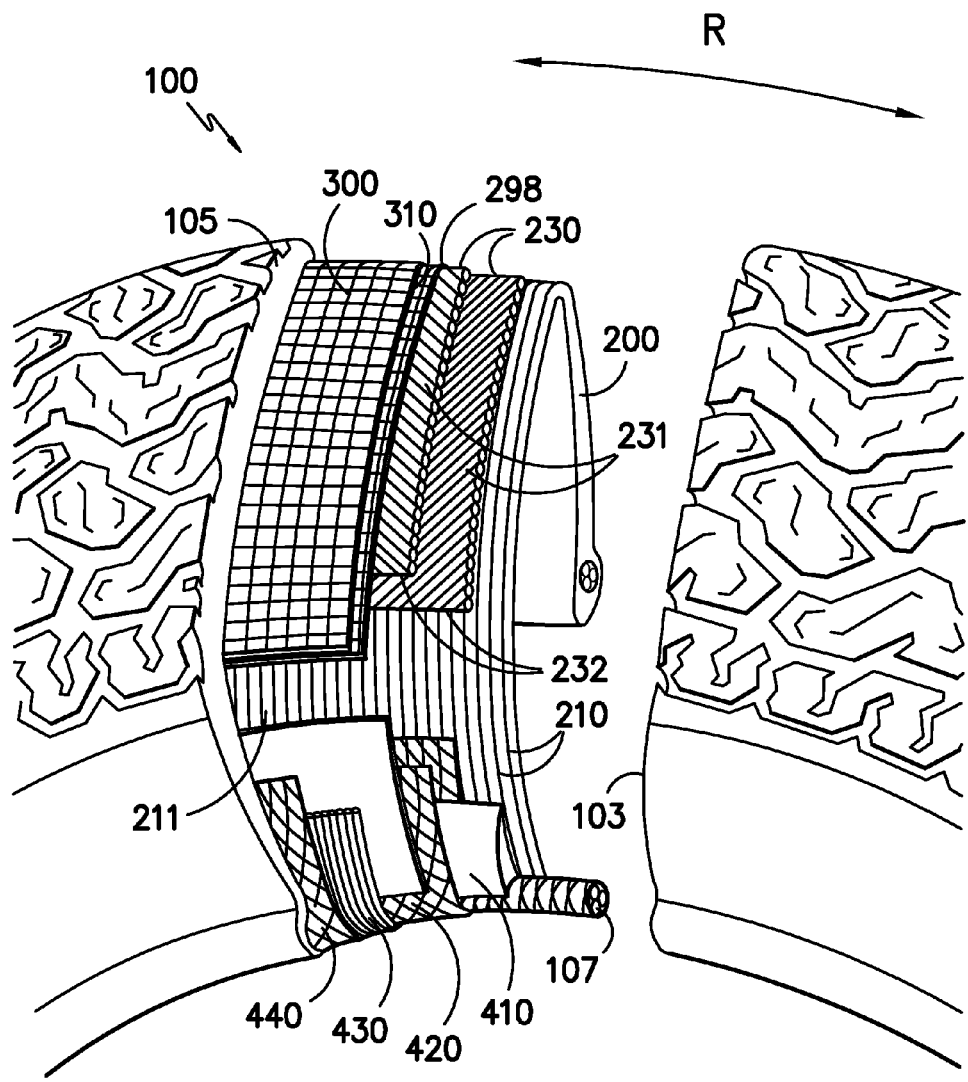
FIG. —1—

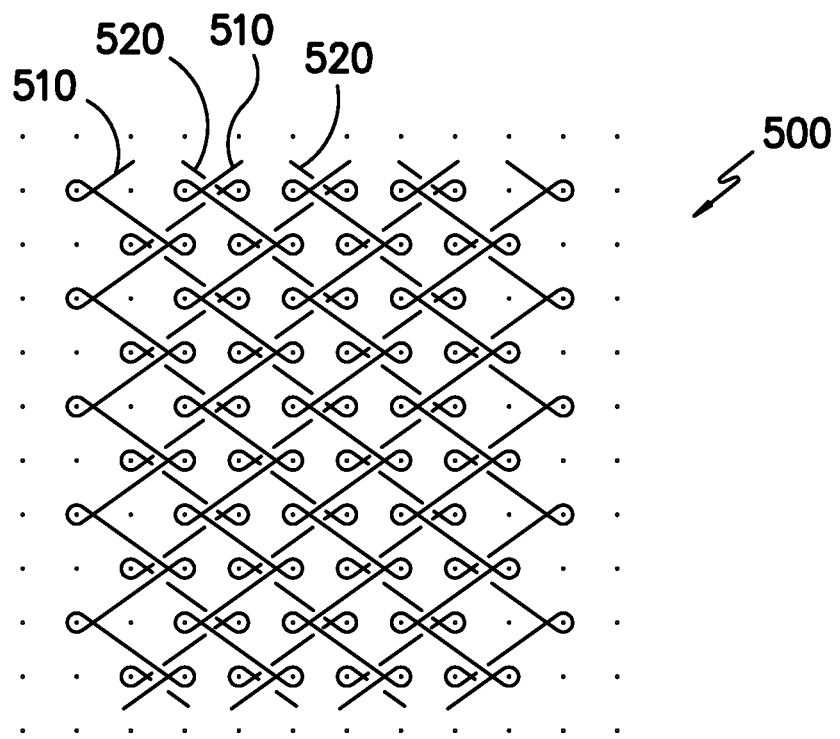
FIG. -2-
| BAR 1 | BAR 2 |
|---|---|
| 1 | 2 |
| 0 | 3 |
| − | − |
| 2 | 1 |
| 3 | 0 |
| = | = |
FIG. -3-

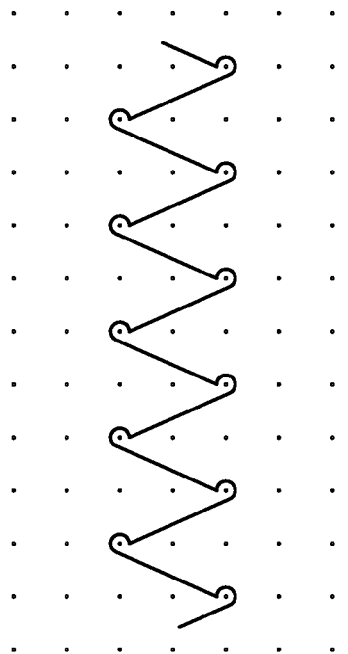 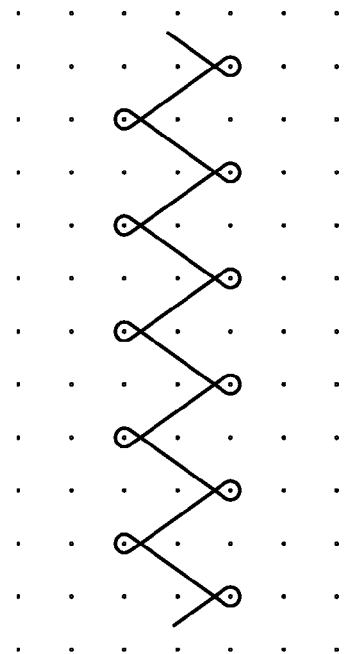
FIG. -4-    FIG. -5-

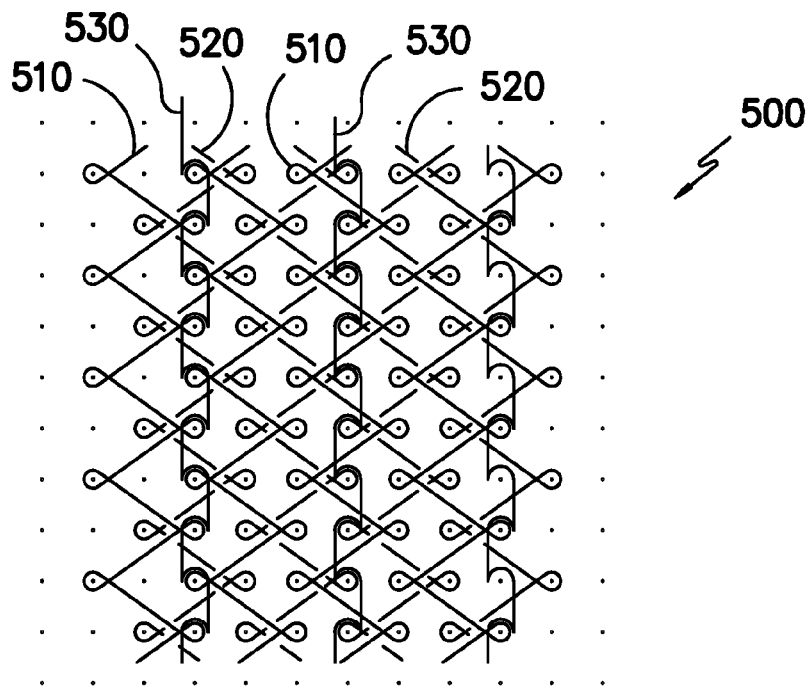
FIG. -6-
FIG. -7-

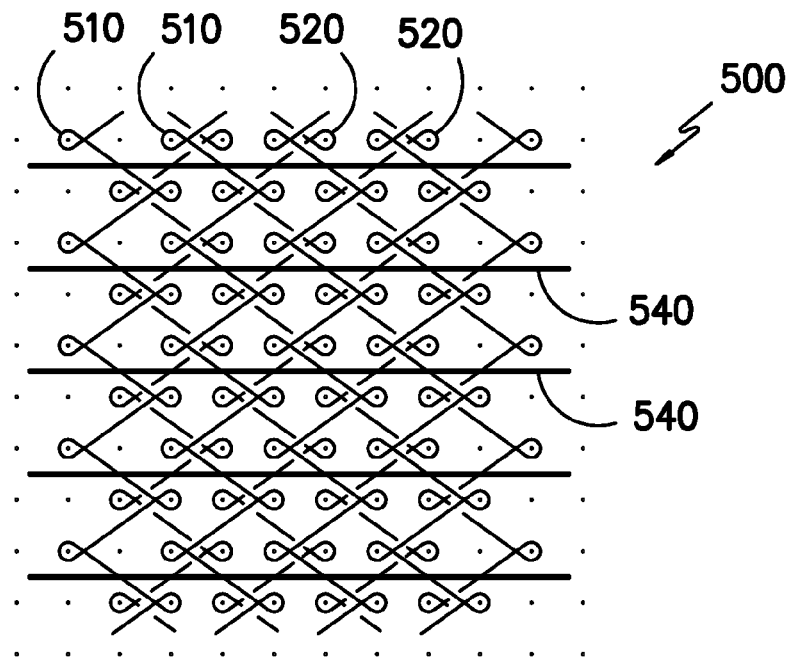
FIG. -8-
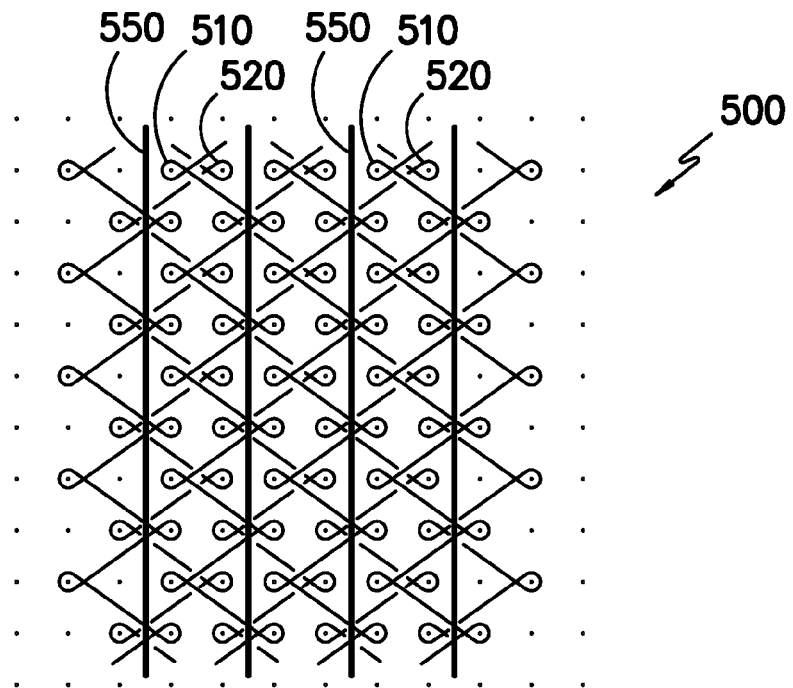
FIG. -9-

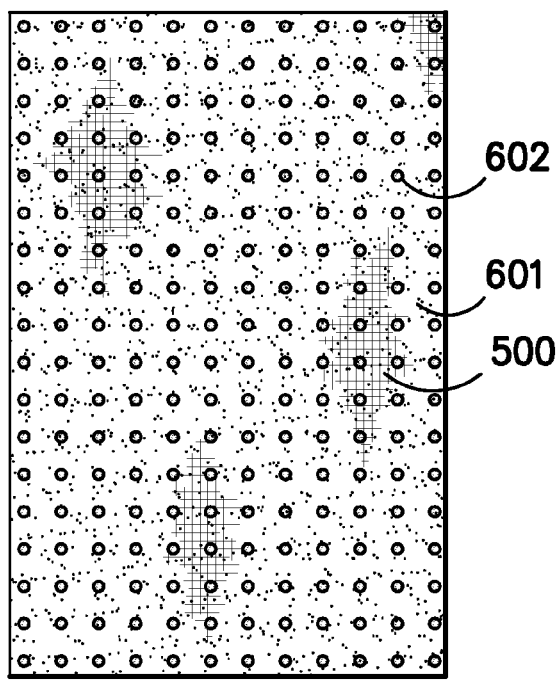
FIG. -10-
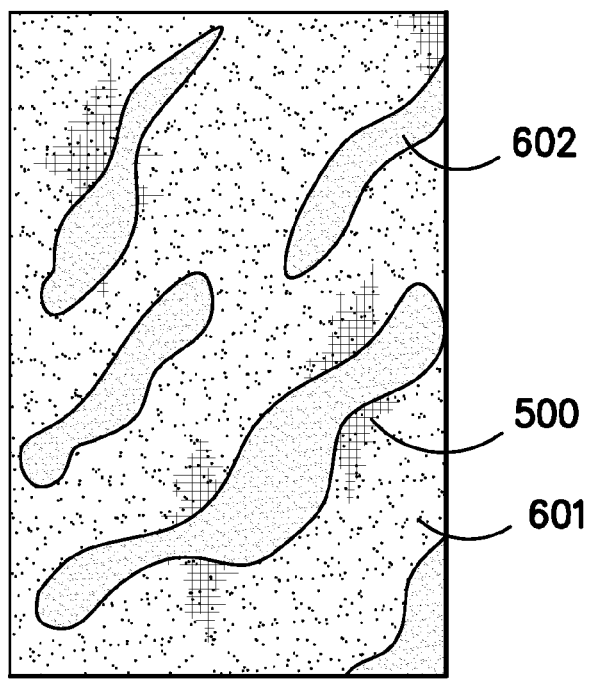
FIG. -11-

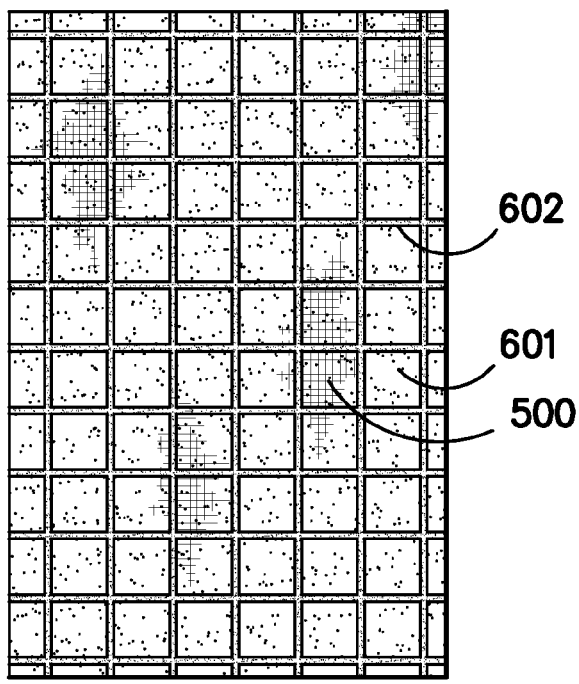
FIG. -12-
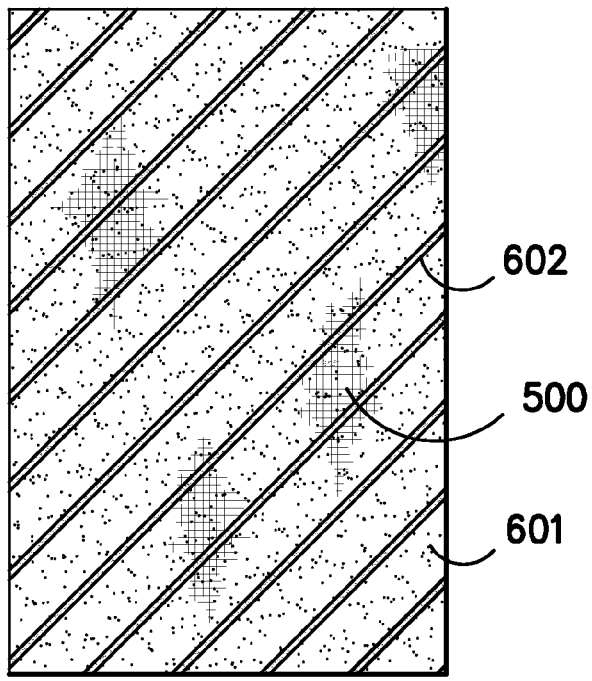
FIG. -13-

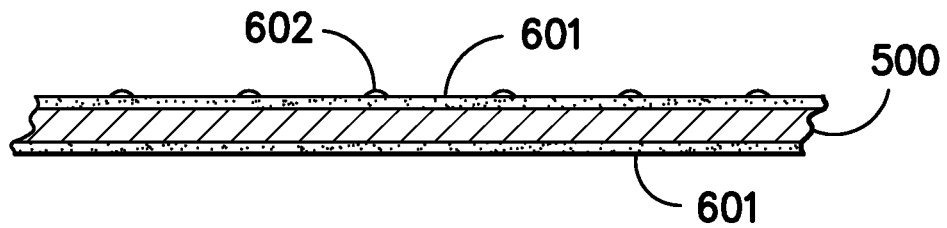
FIG. -14-
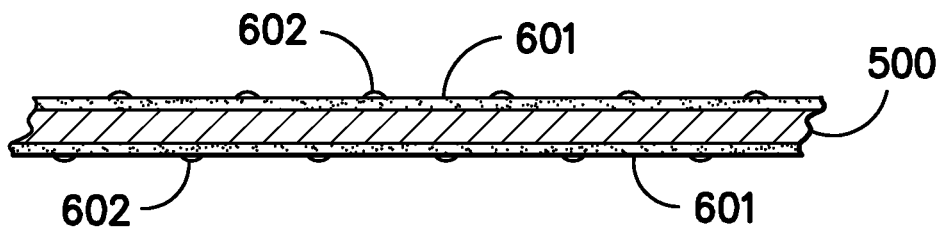
FIG. -15-
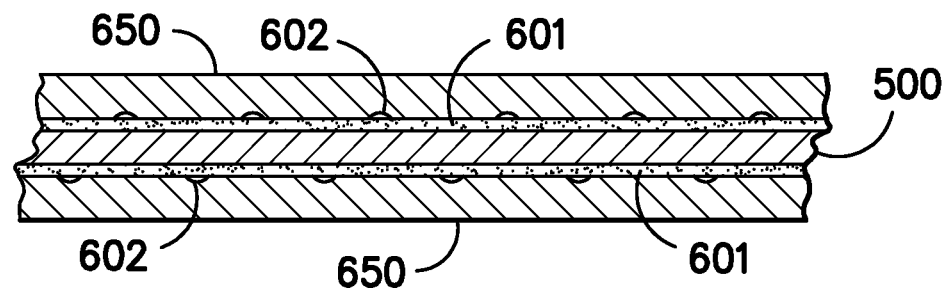
FIG. -16-

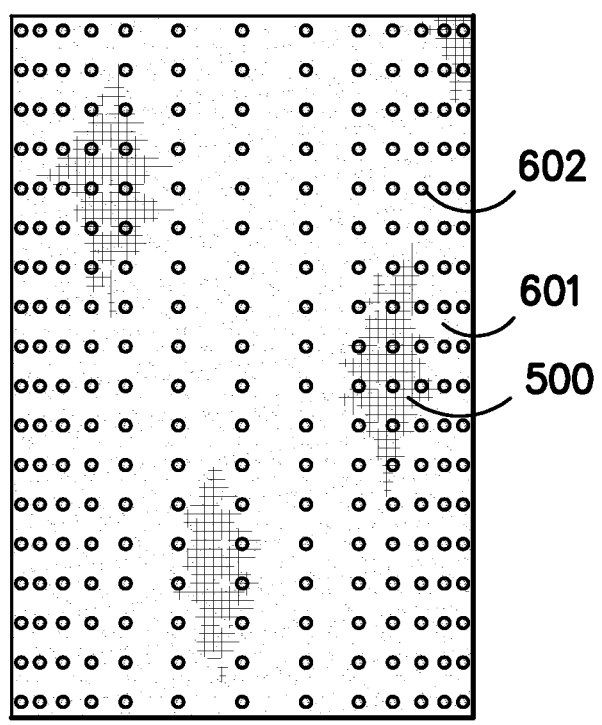
FIG. -17-

US 9,027,620 B2

TIRE HAVING A DOUBLE CORD STITCH KNIT FABRIC IN SIDEWALL AREA

TECHNICAL FIELD

The present disclosure relates generally to knit fabrics for use in tires and in particular to the construction of ply tires with a double cord stitch knit fabric in the sidewall area of the tire.

BACKGROUND

Some vehicles, such as trucks, large equipment, and high performance cars, have a need for tires having additional reinforcement in the sidewall area. There is a need for fabrics that have enough elongation to allow for stretching during the lift up of the tire during manufacturing (and other rubber reinforced articles) and provide excellent reinforcement.

BRIEF SUMMARY

A tire containing a pair of beads, at least one carcass ply extending from one bead to the other bead forming a pair of sidewall areas of the tire and a tread area of the tire, and at least one layer of a knit fabric in the sidewall area of the tire, where the knit fabric has a warp and weft direction and is a double cord stitch knit fabric. A method of making the fabric and tire are also disclosed.

BRIEF DESCRIPTION OF THE FIGURES

An embodiment of the present invention will now be described by way of example, with reference to the accompanying drawings.

FIG. 1 is a cutaway partial view of a pneumatic radial tire.

FIG. 2 depicts the yarn patterns for one embodiment of the double cord stitch knit fabric.

FIG. 3 is chain notation for lapping diagram of FIG. 2.

FIGS. 4 and 5 depict alternative yarn patterns for use in the double cord stitch knit fabric.

FIGS. 6 and 7 depict the yarn patterns for additional embodiments of the double cord stitch knit fabric having an additional set of warp yarns in a chain stitch.

FIG. 8 depicts the yarn patterns for one embodiment of the double cord stitch knit fabric having a laid-in weft yarn.

FIG. 9 depicts the yarn patterns for one embodiment of the double cord stitch knit fabric having a laid-in warp yarn.

FIG. 10 is a schematic of a top view of a pattern coated double cord stitch knit fabric having tackifing layer on surface of the fabric over the adhesion layer in a discontinuous dot pattern.

FIG. 11 is a schematic of a top view of a pattern coated double cord stitch knit fabric having tackifing layer on surface of the fabric over the adhesion layer in a discontinuous pattern of random areas.

FIG. 12 is a schematic of a top view of a pattern coated double cord stitch knit fabric having tackifing layer on surface of the fabric over the adhesion layer in a grid pattern.

FIG. 13 is a schematic of a top view of a pattern coated double cord stitch knit fabric having tackifing layer on surface of the fabric over the adhesion layer in a pattern of a series of parallel lines.

FIGS. 14 and 15 are schematics of side views of double cord stitch knit fabrics showing the tackifing layer having a discontinuous pattern on surface of the fabric over the adhesion layer.

FIG. 16 is a schematic of a side view of the double cord stitch knit fabric showing the tackifing layer having a discontinuous pattern on surface of the fabric over the adhesion layer, where the coated double cord stitch knit fabric is embedded into rubber.

FIG. 17 is a schematic of a top view of the pattern coated double cord stitch knit fabric having tackifing layer on surface of the fabric over the adhesion layer in a pattern of dots of varying density across the fabric.

DETAILED DESCRIPTION

"Apex" means a reinforced or non-reinforced elastomer positioned radially above a bead core.

"Axial" and "axially" mean lines or directions which are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Cut belt or cut breaker reinforcing structure" means at least two cut layers of plies of parallel cords, underlying the tread, unanchored to the bead, and having both left and right cord angles in the range from 10 degrees to 45 degrees with respect to the equatorial plane of the tire.

"Bias-ply tire" means a tire having a carcass with reinforcing cords in the carcass ply extending diagonally across the tire from bead core to bead core at about a 25°-50° angle with respect to the equatorial plane of the tire. Cords run at opposite angles in alternate layers.

"Cap ply" means a reinforcement structure, typically a woven or knit fabric, located under the tread portion of the tire.

"Circumferential" means lines or directions extending along the perimeter of the surface of the annular tread perpendicular to the axial direction.

"Chafers" refer to narrow strips of material placed around the outside of the bead to protect cord plies from the rim, distribute flexing above the rim, and to seal the tire.

"Chipper" refers to a narrow band of fabric or steel cords located in the bead area whose function is to reinforce the bead area and stabilize the radially inward most part of the sidewall.

"Cord" means one of the reinforcement strands of which the plies in the tire are comprised.

"Flipper" means a reinforced fabric wrapped about the bead core and apex.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Turn-up end" means the portion of a carcass ply that turns upward (i.e., radially outward) from the beads about which the ply is wrapped.

Referring now to FIG. 1, there is shown a tire 100, comprising sidewalls 103 extending from the bead 107 to the tread 105. The tire 100 includes a carcass 200 covered by the tread 105. In FIG. 1, the tire 100 is a radial tire; however, the present invention is not limited to radial tires and can also be used with other tire constructions. The carcass 200 is formed from one or more plies of tire cord 210 terminating at the inner periphery of the tire in metal beads 107, with at least one breaker 230 located circumferentially around the tire cord 210 in the area of the tread 105. In the tire shown in FIG. 1, the carcass 200 is constructed so that the reinforcing cords 210 are running substantially radially of the intended direction of rotation R of the tire 100. The breakers 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The breakers 230 extend across the width of the tread 105 of the tire terminating in edges 232 in the area of the tire 100 where the tread 105 meets the sidewall 103. In some tire constructions, a cap ply layer 300 is located between the breakers 230 and the tread 105.

On top of the bead 107 is the bead apex 410 and surrounding at least partially the bead 107 and the apex 410 is a flipper 420. The flipper 420 is a fabric layer disposed around the bead 107 and inward of the portion of the turn-up end 430. A chipper 440 is disposed adjacent to the portion of the ply 430 that is wrapped around the bead 107. More specifically, the chipper 440 is disposed on the opposite side of the portion of the ply the "turn-up end" 430 from the flipper 420. The sidewall may also contain other non-shown fabric layers, for example chafer fabrics, toe protector fabrics, or fabrics wrapping around the bead, extending from the bead up the side of the sidewall, extending from the tread down the sidewall, in the shoulder area, or completely covering the sidewall. Any fabric extending between the bead and the tread is defined herein as a "sidewall fabric". This includes fabrics that also extend around the bead to the inside of the tire such as a flipper fabric, as long as at least part of the fabric is located between the bead and the tread.

Tires are typically constructed on mandrels and then are blown-up and expanded to form the three-dimensional tire shape. The sidewall fabrics must be able to stretch to accommodate this expansion and shaping. Typically bias fabrics are used as they can adapt to some level of stretching.

The sidewall fabric is preferably a type of net knit fabric having stretch-ability in more than one direction referred to as a double cord stitch knit fabric. It has been shown that the double cord stitch knit fabric provides good stretch-ability in more than one direction making it well suited to goods that undergo an expansion during manufacture, such as a tire. FIG. 2 show the stitch pattern of one embodiment of the double cord stitch knit fabric. Such a pattern forms a "net" and provides stretch-ability to the fabric.

The sidewall area of the tire comprises at least one layer of a double cord stitch knit fabric. In another embodiment, the sidewall area of the tire comprises at least two layers of knit fabrics, at least one of the layers being a double cord stitch fabric. The knit fabrics may overlap each other or be placed in discrete sections of the sidewall. In one embodiment, a chafer may comprise two layers of the double cord stitch knit fabric for added protection. In another embodiment, the double cord stitch knit fabric may be used for both the clipper and the flipper. In the embodiments where there is more than one layer of knit fabric in the sidewall area, preferably at least one of the layers is a double cord stitch knit fabric.

The double cord stitch knit fabric may also be used in any other suitable reinforced rubber article such as hoses, belts, and printers blankets. For a reinforced rubber article being a hose, one of the most widespread and most suitable conventional hose is the so-called "mesh-reinforced" type, in which the tubular reinforcement fabric is constituted by a yarns spirally wound on the flexible hose forming two sets of yarns, the first in parallel and equidistant rows and superimposed on an equal number of transverse threads along likewise parallel and equidistant lines which are arranged symmetrically with respect to the axis of the tubular body of the hose so as to form a fabric "mesh" with diamond-shaped cells. The double cord stitch fabric may be used as the fabric in the hose. Typically the inner layer of rubber or plastic is covered by the fabric which is then covered by an outer layer of rubber or plastic. In one embodiment, the reinforcement fabric is arranged in a spirally wound configuration about the tubular body of the hose.

Some other fabric reinforced rubber products include printer blankets and transmission belts. In offset lithography the usual function of a printing blanket is to transfer printing ink from a printing plate to an article such as paper being printed whereby the printing blanket comes into repeated contact with an associated printing plate and the paper being printed. Printer blankets typically include a fabric embedded into rubber. Transmission belts and other types of belts also contain fabric reinforced rubber.

The double cord stitch knit fabric may knit in any suitable manner involving the interlooping or stitching of yarn into vertical columns (wales) and horizontal rows (courses) of loops to form the knitted fabric structure. In warp knitting, the loops are formed along the textile length, i.e., in the wale or warp direction of the textile. For a tubular textile, such as circular knit fabric, stitches extending in the axial or longitudinal direction of the tubular textile are called courses and stitches extending along the circumference of the tubular textile are called wales.

The double cord stitch knit fabric contains a plurality of turning points which may be open turning points, closed turning points, or a mixture of the two. In one embodiment, the first and second turning stitches of the first a second warp yarn set of the double cord stitch knit fabric are closed. In another embodiment, the first and second turning stitches of the first a second warp yarn set of the double cord stitch knit fabric are open. In another embodiment, the turning stitches in the double cord stitch knit fabric may be a mixture of open and closed.

The stitching pattern of one embodiment of the double cord stitch knit fabric 500 is shown in FIG. 2, with the bar movements shown in FIG. 3. The double cord stitch knit fabric is marked as part number 500 and may be used in any suitable application (such as clipper or flipper fabric in a sidewall tire application, printers blanket, etc.). The double cord stitch knit fabric 500 contains at least a first set of warp yarns 510 and a second set of warp yarns 520. The first set of warp yarns 510 has a repeating pattern comprising:
  a first turning stitch,
  a stitch shift traversing diagonally two wales and one course in a first direction,
  a second turning stitch,
  a stitch shift traversing diagonally two wales and one course in a second direction opposite to the first direction.

The second set of warp yarns 520 has a repeating pattern comprising:
  a first turning stitch,
  a stitch shift traversing diagonally two wales and one course in the second direction,
  a second turning stitch,
  a stitch shift traversing diagonally two wales and one course in the first direction.

Each first turning stitch of the first set of warp yarns 510 is in the same wale of the fabric and every second turning stitch of the first set of warp yarns 510 is in the same wale of the fabric. Each first turning stitch of the second set of warp yarns 520 is in the same wale of the fabric and every second turning stitch of the second set of warp yarns 520 is in the same wale of the fabric. Additionally, the first turning stitch of the first set of warp yarns 510 is in the same course as the first turning stitch of the second set of warp yarns 520 and the second turning stitch of the first set of warp yarns 510 is in the same course as the second turning stitch of the second set of warp yarns 520.

The warp yarns of the double cord stitch knit fabric may be any suitable yarn, including but not limited to a spun staple yarn, a multifilament yarn, and/or a monofilament yarn. "Yarn", in this application, as used herein includes a monofilament elongated body, a multifilament elongated body, ribbon, strip, fiber, tape, and the like. The term yarn includes a plurality of any one or combination of the above. Some suitable materials for the yarns include polyamide, aramids (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic or any other suitable artificial or natural fiber. In one embodiment, the yarns are preferably rayon, polyester or nylon. In one embodiment, the yarn used for the first warp yarn set is the same as the yarn used for the second warp yarn set. In another embodiment, the yarns used for the first warp yarn set and the second warp yarn set are different.

In one embodiment, the yarns may be single monofilament or multifilaments yarns (twisted and/or cabled cords) made with any of the prior listed materials, also including hybrid yarns, or film-tape yarns. In one embodiment for some tire fabrics, the warp yarns may be between 100 decitex (90 deniers) up to 3,000 decitex made with single or multiple yarns (for example, 235 decitex (single end) or 235 decitex× 2×3 plies equals 1,410 decitex or 1,100 decitex×3×3 plies equal to 9,900 decitex (multiple ends)). The yarns may be flat, textured and/or twisted.

In one embodiment, the warp yarns may be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. Some preferred hybrid yarns include an aramid fiber with a nylon fiber, an aramid fiber with a rayon fiber, and an aramid fiber with a polyester fiber.

FIGS. 4 and 5 illustrate alternative repeating patterns for use in the double cord stitch knit fabric 500. The patterns shown may be used in for the first set of warp yarns 510 and/or the second set of warp yarns 520. FIG. 4 shows a cord stitch pattern having all open turning stitches and FIG. 5 shows a cord stitch pattern having all closed turning stitches. The stitch pattern may also contain a mixture of closed and open turning stitches.

In another embodiment as shown in FIG. 6, the double cord stitch knit fabric 500 contains a first set of warp yarns 510 in a cord stitch pattern, a second set of warp yarns 520 in a cord stitch pattern, and a third set of warp yarns 530 in a chain stitch pattern (sometimes also referred to as a pillar stitch). This chain stitch may be formed from the same materials as the first and/or second warp yarn set or may be a very weak, or thin yarn. One purpose for the chain stitch would be for easier handling and subsequent coating of the double cord stitch knit fabric as the openness of the double cord stitch knit fabric may lead to handling and conveyance difficulties. In FIG. 6, the chain stitch is on every third wale. The chain stitches 530 may also be on every wale, such as shown in FIG. 7, or on any suitable repeating pattern (such as every second, third, fourth, fifth, etc.) In one embodiment, the frequency of the chain stitches on the wales varies across the fabric (for example, one section of the fabric may have chain stitches on every wale, another section may have chain stitches on every fifth wale, and between the two sections may be a frequency gradient or a step change).

In one embodiment, the double cord stitch knit fabric 500 contains stabilizing yarns in the weft and/or warp direction. The stabilizing yarns provide stability to the fabric during formation and subsequent processes and limit the stretch of the fabric in the direction of the stabilizing yarns. If the stabilizing yarns are in the weft direction, the fabric will have unidirectional elongation in the warp direction. If the stabilizing yarns are in the warp direction, the fabric with have unidirectional elongation in the weft direction. Generally, the stabilizing yarns in the weft and warp directions would be disposed substantially regularly. However, increase, or reduction, can be envisaged of the number of reinforcing yarns at certain places in the fabric, notably depending on the destination and end use of the fabric.

The stabilizing yarns may be made of any suitable material including any yarn suitable for use as a warp yarn in the double cord stitch knit fabric. Some suitable materials for the yarns include polyamide, aramids (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, hybrid yarns, polyacrylic or any other suitable artificial or natural fiber. In one embodiment, the stabilizing yarns are preferably rayon, aramid, or nylon. The nylon may be monofilament or multifilament.

FIG. 8 shows one embodiment where stabilizing weft yarns 540 are inserted into the double cord stitch knit fabric 500 between the rows of stitches. The laid-in weft insertion yarns 540 are held in place in the double cord stitch knit fabric 500 by the casts of the warp yarns 510, 520 without participating in the formation of the stitches. As a variant, it includes several, for example two or three, stabilizing yarns in the weft direction between each row of stitches. Though the weft yarns 540 are inserted in every other course in FIG. 8, any suitable insertion pattern may be used such as being disposed one row of stitches out of two, three, four or more.

FIG. 9 shows another embodiment where stabilizing warp yarns 550 are inserted into the double cord stitch knit fabric 500. The laid-in warp insertion yarns 550 in the warp direction are laid-in, meaning that they are disposed between each column of stitches or, as a variant, one column of stitches out of two, three, four or more. Provision can also be envisaged of several, for example two or three, stabilizing yarns 550 between each column of stitches or one column of stitches out of two, three, four or more.

A frequent problem in making a rubber composite is maintaining good adhesion between the rubber and the reinforcement fabric. A conventional method in promoting the adhesion between the rubber and the reinforcement fabric is to pretreat the reinforcing yarns with an adhesion layer typically formed from a mixture of rubber latex and a phenol-formaldehyde condensation product wherein the phenol is almost always resorcinol. This is the so called "RFL" (resorcinol-formaldehyde-latex) method. The resorcinol-formaldehyde latex can contain vinyl pyridine latexes, styrene butadiene latexes, waxes, fillers and/or other additives. "Adhesion layer" used herein includes RFL chemistries and other non-RFL rubber adhesive chemistries.

In one embodiment, the adhesion chemistries are not RFL chemistries. In one embodiment, the adhesion chemistries do not contain formaldehyde. In one embodiment the adhesion composition comprises a non-cross-linked resorcinol-formaldehyde and/or resorcinol-furfural condensate (or a phenol-formaldehyde condensate that is soluble in water), a rubber latex, and an aldehyde component such as 2-furfuraldehyde. The composition may be applied to textile substrates and used for improving the adhesion between the treated textile substrates and rubber materials. More information about these chemistries may be found in U.S. application Ser. No. 13/029,293 filed on Feb. 17, 2011, which is incorporated herein in its entirety.

The double cord stitch knit fabric 500 may be coated with adhesive layer by a conventional method. Preferably, the adhesion layer is a resorcinol formaldehyde latex (RFL) layer or rubber adhesive layer. Generally, the adhesion layer is applied by dipping the double cord stitch knit fabric or yarns (before formation into knit fabric) in the adhesion layer solution. The coated fabric or yarns then pass through squeeze rolls and a drier to remove excess liquid. The adhesion layer is typically cured at a temperature in the range of 150° to 200° C. The adhesion layer is typically on both sides of the double cord stitch knit fabric and preferably coats all or almost all available surface of the yarns within the double cord stitch knit fabric.

In one embodiment, the double cord stitch fabric further comprises a tackifing layer on at least a portion of the double cord stitch knit fabric over the adhesion layer. The tackifing materials serve to form a tackified finish for facilitating adhesion, or green tack, during the building process of a green tire, hose, or other rubber reinforced products. The tackifing materials serve to promote adhesion between the double cord stitch knit fabric (with the adhesion layer 601) and the rubber during manufacture. The selection of materials for the tackified finish will depend greatly upon the materials selected for use in the reinforced rubber product. In prior art, the entire fabric surface was completely covered in a cement coating of rubber or with a different adhesion promoting or tackifing chemistry. In a tire product, it is desirable to reduce the amount of rubber between the layers as the excess rubber absorbs energy from the running tire and causes early wear and failure. Typical examples of tackifing material include mixtures containing resorcinol formaldehyde latex (RFL), isocyanate based material, epoxy based material, rubber, PVC, and materials based on melamine formaldehyde resin.

In one embodiment, the tackifing layer is a continuous, uniform, non-patterned layer. The tackifing layer may be on one or both sides of the double cord stitch knit fabric.

In another embodiment, the tackifing layer is a patterned coating overlying the adhesion layer on the double cord stitch knit fabric. The patterned tackifing layer may be on one or both sides of the double cord stitch knit fabric over the adhesion layer. The first side and the second side of the double cord stitch knit fabric may contain the same pattern or different patterns. In one embodiment, the tackifing material is placed a first side of the double cord stitch knit fabric (over the adhesion layer) in a patterned coating and on the second side, the tackifing material may be placed as a continuous non-patterned coating.

Having the tackifing material in a patterned coating provides for greentack while minimizing the amount of the surface area of the adhesion layer that is covered up and minimizes the amount of rubber and tackifing agents in the tire, hose, or other fabric reinforced rubber products. The patterned coating may be continuous or discontinuous, regular and repeating or random. "Continuous" in this application means that from one edge of the fabric to the other edge there is at least one continuous path that contains the patterned coating and that at least some of the patterned coating areas are connected. Examples of continuous coatings include FIGS. 12 and 13. "Discontinuous" in this application means that the pattern coated areas are discontinuous and not touching one another. In a discontinuous patterned coating, there is no path from one edge of the fabric to the other that contains the patterned coating. Examples of discontinuous coatings include FIGS. 10 and 11. Regular or repeating patterns mean that the pattern has a repeating structure to it. FIGS. 10, 12, and 13 illustrate repeating or regular patterns. FIG. 11 illustrates a random pattern where there is no repeat to the patterned coating. In a random pattern, it is preferred that the random pattern is also discontinuous, not continuous. While the patterned coating is shown as applied to the fabric, a patterned coating of tackifing material may also be applied to the yarns before fabric formation.

FIG. 10 illustrates the embodiment where the patterned coating 602 is in a dot pattern. This pattern is discontinuous and repeating. The dots may be equally spaced on the double cord stitch knit fabric 500 over the adhesion layer 601, or may have differing densities or frequencies of dots, sizing of dots, or size and/or shape of dots across the surface of the fabric. FIG. 11 illustrates the embodiment where the patterned coating 602 is in random, discontinuous spot pattern. FIG. 12 illustrates the embodiment where the patterned coating 602 is in a grid. This pattern is regular and continuous. FIG. 13 illustrates the embodiment where the patterned coating 602 is in a series of parallel lines. This pattern is also regular and continuous. The patterned coating 602 may take any other patterned form including but not limited to indicia, geometric shapes or patterns, and text.

FIGS. 14 and 15 illustrate side views of the coated knit fabric illustrating the patterned coating 602 on one side of the double cord stitch knit fabric 500 (14) and both sides of the double cord stitch knit fabric 500 (15) overlying the adhesion layer 601. The patterned coatings 602 may be the same or different patterns and coverage on both sides of double cord stitch knit fabric 500 (over the adhesion layer 601). For example, one side of the double cord stitch knit fabric 500 may have a regular repeating grid pattern covering 10% of the surface area and the other side of the double cord stitch knit fabric 500 may have a discontinuous repeating dot pattern covering 25% of the surface. Each surface pattern may be chosen to optimize the tire production process and article. FIG. 16 illustrates the coated knit fabric embedded in rubber 650. Preferably, the rubber 650 migrates or impregnates partially or fully the double cord stitch knit fabric 500.

In one embodiment, the patterned coating 602 of tackifing material is on the cross-over points in the double cord stitch knit fabric, for example where the warp yarns cross themselves or each other in the double cord stitch knit fabric. In another embodiment, the patterned coating 602 of tackifing material is substantially only on the cross-over points in the fabric and not on the rest of the double cord stitch knit fabric 500 or in the spaces between the stitches of the double cord stitch knit fabric. This may help eliminate or reduce window pane formation from occurring (where the coating forms a film in the open areas of the fabric).

The patterned coating 602 may be formed by any known method of forming a patterned coating including but not limited to inkjet printing, gravure printing, patterned printing, thermal transfer, spray coating, and silk printing. The thickness and/or physical composition of the patterned coating 602 may vary over the length and/or width of the coated knit fabric. For example, it may be preferred in some embodiments to have a thicker coating or more densely packed pattern in some areas of the fabric. This can be seen, for example, in FIG. 17 where the dot pattern of the patterned coating layer varies over the width of the double cord stitch knit fabric to have a higher amount of patterned coating on the edges of the fabric.

In one embodiment, the patterned coating 602 covers between about 5 and 95% of the surface area of the double cord stitch knit fabric 500. In other embodiments, the patterned coating may cover between about 5 and 70%, 10 and 60%, 45 and 75%, greater than 15%, greater than 20% and greater than 30% of the surface area of the double cord stitch knit fabric 500. In another embodiment, the patterned coating 602 has a weight of between about 5 and 60% wt of the double cord stitch knit fabric 500. In other embodiments, the patterned coating has a weight of between about 5 and 50%, 10 and 50%, 10 and 45%, 15 and 35%, greater than 15%, greater than 20% and greater than 30% of the weight of the double cord stitch knit fabric 500.

The formation of the double cord stitch knit fabric begins with the acquisition of the basic yarns for the fabric. Subsequently, the yarns may be twisted to provide additional mechanical resilience. After the twisting, the double cord stitch knit fabric may be formed in any suitable manner. Preferably, the double cord stitch knit fabric is knitted into a tubular structure. In one embodiment, rachel knitting is used to form the double cord stitch knit fabric. After the fabric formation, the fabric is finished with an adhesion layer before or after slitting. The adhesion layer may also be applied to the yarns before forming into a fabric. Preferably, the adhesion layer is applied after the tubular fabric is formed but before the fabric is slit into the flat knit fabric. The adhesion layer helps provide stability to the double cord stitch knit fabric and facilitates easier slitting and handling of the fabric. Next, an optional tackifing layer is applied to the flat knit fabric. This may in a patterned or un-patterned manner. The coated double cord stitch fabric is then slit into the desired specific widths for different sidewall fabric applications. In addition to the adhesion layer and/or the tackifing layer, the double cord stitch knit fabric may instead be calendared with rubber to facilitate incorporation into the tire.

The tire formation typically consists of two stages: in the first stage the carcass, the bead components and the sidewalls are put into places. During this stage, all the bead and sidewall reinforcements (chipper, flipper and chafer) are also added to the carcass. At this point the tire is expanded and assumes the typical tire shape. During this passage the double cord stitch knit fabric elongates and takes its final positioning. In the second stage, after expansion, the brakers and the tread compounds are also place. After this the green tire is completed and ready to be molded.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tire comprising:
a pair of beads;
at least one carcass ply extending from one bead to the other bead forming a pair of sidewall areas of the tire and a tread area of the tire; and,
at least one layer of a knit fabric in the sidewall area of the tire, wherein the knit fabric has a warp and weft direction and is a double cord stitch knit fabric, wherein the double cord stitch knit fabric is able to be stretched in more than one direction, wherein the double cord stitch knit fabric is able to be stretched during the tire building process, wherein double cord stitch knit fabric consists of a first set of warp yarns and a second set of warp yarns, wherein the first set of warp yarns has a repeating pattern comprising:
a first turning stitch,
a stitch shift traversing diagonally two wales and one course in a first direction,
a second turning stitch,
a stitch shift traversing diagonally two wales and one course in a second direction opposite to the first direction, wherein every first turning stitch of the first set of warp yarns is in the same wale and wherein every second turning stitch of the first set of warp yarns is in the same wale,
wherein the second set of warp yarns has a repeating pattern comprising:
a first turning stitch,
a stitch shift traversing diagonally two wales and one course in the second direction,
a second turning stitch,
a stitch shift traversing diagonally two wales and one course in the first direction, wherein every first turning stitch of the second set of warp yarns is in the same wale and wherein every second turning stitch of the second set of warp yarns is in the same wale,
wherein the first turning stitch of the first set of warp yarns is in the same course as the first turning stitch of the second set of warp yarns and wherein the second turning stitch of the first set of warp yarns is in the same course as the second turning stitch of the second set of warp yarns.

2. The tire of claim 1, wherein the double cord stitch knit fabric comprises a first set of warp yarns and a second set of warp yarns, wherein the first set of warp yarns comprise cord stitches in a pattern of 0-1/2-3 and the second set of warp yarns comprise cord stitches in a pattern of 2-3/1-0.

3. The tire of claim 1, wherein the double cord stitch knit fabric is a tire fabric selected from the group consisting of a chipper, a flipper, and a chafer.

4. The tire of claim 1, wherein the double cord stitch knit fabric has a first side and a second side and wherein the double cord stitch knit fabric comprises an adhesive layer on at least one of the first and second side of the fabric.

5. The tire of claim 4, wherein the double cord stitch knit fabric further comprises a tackifing layer overlaying a portion of the adhesive layer coating, wherein the coating of the tackifing layer is in a pattern.

6. The tire of claim 1, wherein the first and second turning stitches of the first and second sets of warp yarns are closed.

7. A method of making a tire comprising:
knitting a tubular-shaped double cord stitch knit fabric having a first side and a second side, wherein the knit fabric has a warp and weft direction, wherein the double cord stitch knit fabric is able to be stretched in more than one direction, wherein the double cord stitch knit fabric is able to be stretched during the tire building process, wherein double cord stitch knit fabric consists of a first set of warp yarns and a second set of warp yarns, wherein the first set of warp yarns has a repeating pattern comprising:
a first turning stitch,
a stitch shift traversing diagonally two wales and one course in a first direction,
a second turning stitch,
a stitch shift traversing diagonally two wales and one course in a second direction opposite to the first direction, wherein every first turning stitch of the first set of warp yarns is in the same wale and wherein every second turning stitch of the first set of warp yarns is in the same wale,
wherein the second set of warp yarns has a repeating pattern comprising:
a first turning stitch,
a stitch shift traversing diagonally two wales and one course in the second direction,
a second turning stitch,
a stitch shift traversing diagonally two wales and one course in the first direction, wherein every first turning stitch of the second set of warp yarns is in the same wale and wherein every second turning stitch of the second set of warp yarns is in the same wale,
wherein the first turning stitch of the first set of warp yarns is in the same course as the first turning stitch of the second set of warp yarns and wherein the second turning stitch of the first set of warp yarns is in the same course as the second turning stitch of the second set of warp yarns;
coating the tubular knit fabric with an adhesive layer on at least the first or second side;
slitting the tubular knit fabric forming a flat knit fabric;
optionally applying a tackifing layer to the flat knit fabric overlaying at least a portion of the adhesive layer;
applying the knit fabric to a sidewall area of a green tire; and,
expanding and curing the green tire.

8. The method of claim 7, wherein the tackifing layer is patterned.

* * * * *